United States Patent [19]
Milzner et al.

[11] 3,862,188
[45] Jan. 21, 1975

[54] PYRIMIDINYL PHOSPHORIC AND THIOPHOSPHORIC ACID ESTERS

[75] Inventors: Karlheinz Milzner, Basel; Fritz Reisser, Therwil, both of Switzerland

[73] Assignee: Sandoz Ltd. (a/k/a Sandoz AG), Basel, Switzerland

[22] Filed: Feb. 28, 1972

[21] Appl. No.: 230,043

[30] Foreign Application Priority Data
Mar. 4, 1971 Switzerland............ 3190/71
Jan. 12, 1972 Switzerland............ 429/72
Aug. 20, 1971 Switzerland............ 12298/71
Jan. 12, 1972 Switzerland............ 430/72

[52] U.S. Cl.... 260/251 P, 260/251 R, 260/256.4 E, 260/256.4 R, 260/256.5 R, 424/200
[51] Int. Cl. .................... C07d 51/36, C07d 51/40
[58] Field of Search................ 260/251 P

[56] References Cited
UNITED STATES PATENTS
2,754,243  7/1956  Gysin et al............ 167/33
FOREIGN PATENTS OR APPLICATIONS
83,560  2/1954  Norway............ 260/251 P

*Primary Examiner*—Donald G. Daus
*Assistant Examiner*—Ralph D. McCloud
*Attorney, Agent, or Firm*—Gerald D. Sharkin; Richard E. Vila

[57] ABSTRACT

The present invention concerns novel pyrimidinyl phosphoric and thiophosphoric acid esters of the formula:

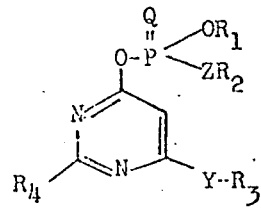

wherein $R_1$, $R_2$, $R_3$ and $R_4$ are inter alia each alkyl, Q and Y are each oxygen or sulphur and Z is oxygen or

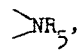

wherein $R_5$ is hydrogen or alkyl of 1 to 5 carbon atoms.

The compounds possess insecticidal activity.

11 Claims, No Drawings

PYRIMIDINYL PHOSPHORIC AND THIOPHOSPHORIC ACID ESTERS

IMPROVEMENTS IN OR RELATING TO ORGANIC COMPOUNDS

The present invention relates to pyrimidinyl phosphoric and thiophosphoric acid esters.

The present invention provides compounds of formula I,

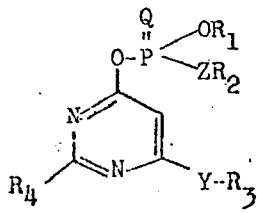

wherein $R_1$, $R_2$ and $R_4$ which may be the same or different, are each alkyl or one to five carbon atoms $R_3$ is alkyl of one to six carbon atoms, cycloalkyl of three to eight carbon atoms, phenyl or phenyl substituted by at least one of chlorine, bromine and alkyl of one to three carbon atoms, Q and Y which may be the same or different, are each oxygen or sulphur and Z is oxygen or

wherein $R_5$ is hydrogen or alkyl of one to five carbon atoms.

The present invention also provides a process for the production of a compound of formula I which comprises reacting a compound of formula II,

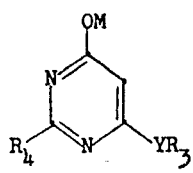

wherein $R_3$, $R_4$ and Y are as defined above and

M is hydrogen or a suitable cation, preferably hydrogen or an alkali metal or ammonium cation, with a compound of formula III,

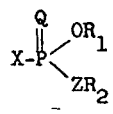

wherein $R_1$, $R_2$, Z and Q are as defined above and

X is chlorine or bromine.

The process may, for example, be effected as follows viz.

The reaction may be effected in a suitable solvent e.g., an ester such as ethyl acetate, an amide such as dimethylformamide, an aromatic hydrocarbon such as toluene or xylene, a halogenated hydrocarbon such as chlorobenzene or chloroform, an ether such as dioxane or tetrahydrofuran, or a nitrile such as acetonitrile. The reactants are mixed at a temperature between 0° and 120°C preferably at room temperature. In the case where M of formula II is hydrogen, an acid acceptor such as triethylamine or potassium carbonate may conveniently be employed. Preferably however M of formula II is sodium and the compound of formula II is employed immediately after the preparation thereof. It is preferably employed in dimethylformamide as solvent. Preferably also, X of formula III is chlorine and the compound of formula III is preferably employed in toluene as solvent. The reaction mixture may be stirred for between 1 and 6 hours, conveniently at an elevated temperature e.g., between 40° and 120°C. After the reaction, the reaction mixture may be allowed to stand before working up. Working up may be effected in conventional manner.

The compounds of formula I are obtained as colourless oils or crystalline compounds which may be characterised by melting point or Rf-value as appropriate. They are soluble in organic solvents and generally readily emulsified in water.

The compounds of formula II employed as starting material in the production of compounds of formula I, may be produced by reacting a compound of formula IV,

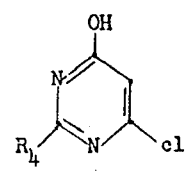

wherein $R_4$ is as defined above,
with a compound of formula V,

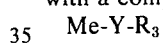

wherein $R_3$ and Y are as defined above and

Me is sodium or potassium, and when required converting the resulting compound into a salt.

The compounds of formulae III and IV are described in the literature.

The compounds of formula I are useful because they possess biocidal activity. In particular, the compounds are useful as insecticides as indicated by the following tests viz.

Test (i) Effect against *Carausius morosus* (Indian rod locust) — feed effect

Tradescantia branches are immersed for 3 seconds in an emulsion containing 0.0125 percent of a compound of formula I. After drying the coating, each of the Tradescantia branches is inserted into a small glass tube filled with water which is placed in a glass dish. 10 Carausius larvae in the second stage are placed in the glass dish which is then closed with a wire mesh lid. After 5 days the rate of mortality is determined as a percentage by counting out the live and dead insects.

Test (ii) Effect against *Ephestia kuehniella* moth) — *contact effect*

Petri dishes with a diameter of 7 cm, each containing 10 caterpillars having a length of 10 to 12 mm, are coated by spraying with 0.1 to 0.2 cc of an emulsion containing 0.05 percent of a compound of formula I. The dishes are then covered with a fine mesh brass wire grid. After drying the coating, a wafer is given as food and renewed as required. After 5 days the rate of mortality is determined as a percentage by counting out the live and dead insects.

Test (iii) Effect against *Aphis fabae* (black bean aphid) — contact effect

Broad bean plants (*Vicia faba*) are sprayed to run off with a spraying liquor containing 0.0125 percent of a compound of formula I. The broad bean plants are strongly infected with all the forms of development of the black bean aphid (*Aphis fabae*). After 2 days the rate of mortality is determined.

Test (iv) Effect against *Panagrellus redivivus* (paste nematode)

1 cc of an aqueous suspension of *Panagrellus redivivus*, containing about 120 insects, is placed in a small cup having a diameter of 5.5 cm and a height of 3.2 cm, and which contains 7 g of Terralite. 1 cc of an emulsion containing a compound of formula I is spread over the Terralite. After 48 hours the content of the cup is examined in accordance with the extraction method of Baermann (G. Baermann Meded. Geneesk, Lab. Weltevreden 41–47, 1917), and the live nematodes are counted out under a binocular magnifying glass.

It is to be understood that the term insect as used herein is used in a broad sense and may include classes of animal organism related or similar to the class Insecta such as Nematoda. The term "insecticide" and "insecticidal" as used herein should be construed accordingly.

For the abovementioned use the amount of the compound to be applied will vary depending on the particular compound employed, the mode of application, ambient conditions and the effect desired. With regard to plant protection, in general a satisfactory amount to be applied to a plant locus is between 4 and 10 kg/hectare.

The compounds may be used in animal buildings e.g., stables, inhabited rooms e.g., cellars and attics, as well as in plant loci.

The compounds may be employed as a composition with insecticidal carriers and diluents in solid or liquid form e.g., spraying and dusting powders, strewing granulates, spraying liquids and aerosols.

Solid forms may include carriers such as diatomaceous earth, talc, caolite, attapulgite, pyrophyllite, artificial mineral fillers based on $SiO_2$ and silicates, lime, decahydrate and plant material carriers such as walnut and flour. Adjuvants such as wetting and dispersing agents. e.g., sodium-laurylsulphate, sodium-dodecyl benzenesulphate, condensation products from naphthalene sulphonate and formaldehyde, polyglycol ether and lignin derivatives such as sulphite liquor, may also be included in the case of wettable powders to be applied as a water suspension. Granulates are produced by coating or impregnating granular carrier materials such as pumice, limestone, attapulgite and coalite with the compounds.

Liquid forms may include non-phytotoxic diluents such as alcohols, glycols, glycolic ethers, aliphatic and aromatic hydrocarbons e.g., xylene, alkyl naphthalenes and other petroleum distillates, and ketones e.g., cyclohexanone and isophoxone. Adjuvants such as surface active agents, e.g., wetting and emulsifying agents such as polyglycol ether formed by the reaction of an alkylene oxide with high molecular weight alcohols, mercaptans or alkyl phenols, and/or alkyl benzene sulphonates, may be included in emulsion concentrate forms.

Aside from the abovementioned carriers, diluents and adjuvents already mentioned, adjuvants such as stabilizing agents, desactivators (for solid forms with carriers having an active surface), agents for improving adhesiveness to surface treated, anticorrosives, defoaming agents and pigments may also be included.

Concentrate forms of composition generally contain between 1 and 90 percent preferably between 5 and 50 percent by weight of active compound.

Application forms of composition generally contain between 0.02 and 90 percent, preferably between 0.1 and 20 percent by weight of active compound.

Examples of concentrate and application forms of composition will now be described:

a. Emulsifiable concentrate 25 parts by weight of a compound of formula I are mixed with 20 parts by weights of isooctylphenyldecaglycol ether, 5 parts by weight of the calcium salt of an alkyl aryl sulphonate and 50 parts by weight of xylene whereby a clear solution is obtained which may be readily emulsified in water. The concentrate is diluted with water to the desired concentration for use.

b. Emulsifiable concentrate 25 parts by weight of a compound of formula I are mixed with 25 parts by weight of isooctylphenyloctaglycol ether, 5 parts by weight of the calcium salt of an alkyl aryl sulphonate and 45 parts by weight of an aromatic petroleum fraction having a boiling point of 210° to 280° ($D_{20}$ : 0.92). The concentrate is diluted with water to the desired concentration for use.

c. Spraying and dusting powder application form 25 parts by weight of a compound of formula I, 2 parts by weight of lauryl sulphate, 3 parts by weight of sodium lignine sulphonate are mixed with 70 parts by weight of diatomaceous earth and ground until the grains have obtained a size of 10 $\mu$ as an average The preferred compounds of formula I are those wherein Y is oxygen, particularly those wherein Y is oxygen, Q is sulphur and Z is oxygen and those wherein Y is oxygen, Q is oxygen and Z is $$>NH.$$

The production of compounds of the invention will now be described by way of Example. Temperatures are indicated in degrees Centigrade.

EXAMPLE 1

0,0-Dimethyl-0-(2-methyl-4-methoxy-pyrimidinyl-6)-thionophosphate 4.8 g (0.1 mol) of sodium hydride (50 percent in mineral oil) are added while stirring vigorously and in the absence of moisture to 14 g (0.1 mol) of 2-methyl-4-methoxy-6-hydroxypyrimidine in 300 cc of absolute dimethylformamide. After stirring the mixture at room temperature for about half an hour solids are rapidly removed by suction and 16 g (0.1 mol) of 0,0-dimethylthionophosphoric acid chloride in 100 cc of absolute toluene are added dropwise and while stirring to the filtrate. The mixture is stirred at 45° for a further 5 hours and is allowed to stand over night at room temperature. The solvent is decanted as far as possible in a vaacuum/high vacuum and the residue is taken up in ether and the etheral solution is concentrated by evaporation. The compound crystallizes in the form of colourless crystals having a M.P. of 66°–67°. The degree of purity is examined on a silica gel thin layer plate with fluorescence indicator using ether as eluant. Rf-value = 0.75. Chromatographical purification of the substance may be effected on a silica gel column with ether as eluant.

Analysis: $C_8H_{13}N_2O_4PS$   Molecular weight: 264.24
| | C | H | N | P | S |
|---|---|---|---|---|---|
| Calc. | 36.4% | 5.0% | 10.6% | 11.7% | 12.1% |
| Found | 36.8% | 5.1% | 10.7% | 11.7% | 12.1% |

EXAMPLE 2

0,0-Dimethyl-0-(2-methyl-4-ethoxy-pyrimidinyl-6)-thionophosphate 4.8 g (0.1 mol) of sodium hydride (50 percent in mineral oil) are added while stirring vigorously and in the absence of moisture to 15.4 g (0.1 mol) of 2-methyl-4-ethoxypyrimidine in 300 cc of absolute dimethylformamide. After stirring the mixture at room temperature for about half an hour solids are rapidly removed by suction and 16 g (0.1 mol) of 0,0-dimethylthionophosphoric acid chloride in 100 cc of absolute toluene are added dropwise and while stirring to the filtrate. The mixture is stirred at 45° for a further 5 hours and is allowed to stand over night at room temperature. The solvent is decanted as far as possible in a vacuum/high vacuum. The residue is taken up in chloroform, is washed four times with 100 cc amounts of 1 N solution of sodium hydroxide and subsequently four times with 100 cc amounts of water having a temperature of 8°. The chloroform phase is dried with sodium sulphate and optionally treated with animal charcoal. After filtration it is concentrated in a vacuum by evaporation. The compound is obtained in the form of an almost colourless oil. The degree of purity is examined on a silica gel thin layer plate with fluorescence indicator using ether as eluant. Rf-value = 0.52. Chromatographical purification of the substance may be effected on a silica gel column with ether as eluant.

Analysis: $C_9H_{15}N_2O_4PS$   Molecular weight: 278.3
| | C | H | N | P | S |
|---|---|---|---|---|---|
| Calc. | 38.8 % | 5.4 % | 10.1 % | 11.1 % | 11.5 % |
| Found | 39.2 % | 5.8 % | 10.0 % | 10.9 % | 11.5 % |

In an analogous manner to that described in Examples 1 and 2 the following compounds may be produced viz.

| Q | Z | $R_1$ | $R_2$ | $R_3$ | $R_4$ | Y |
|---|---|---|---|---|---|---|
| S | O | $CH_3$ | $CH_3$ | △ (cyclopropyl) | $CH_3$ | O |
| S | O | $CH_3$ | $CH_3$ | cycloheptyl | $CH_3$ | O |
| S | O | $CH_3$ | $CH_3$ | -C₆H₄-Cl | $CH_3$ | O |
| S | O | $CH_3$ | $CH_3$ | -C₆H₄-Br | $CH_3$ | O |
| S | O | $CH_3$ | $CH_3$ | -C₆H₄-$C_2H_5$ | $CH_3$ | O |
| S | O | $CH_3$ | $CH_3$ | $n\text{-}C_6H_{14}$ | $CH_3$ | O |
| S | O | $n\text{-}C_5H_{12}$ | $CH_3$ | $CH_3$ | $CH_3$ | O |

In the following Examples 3 to 51 the process for the production of compounds of formula I is analogous to that described in Examples 1 and 2. The compounds are obtained as slightly coloured or colourless oils. In Examples 3 to 51 Q is sulphur and Z is oxygen.

| Example No. | $R_1$ | $R_2$ | $R_3$ | $R_4$ | Y | Empirical formula | Molecular weight | Rf-value* | C | H | N | P | S (Calc./Found) |
|---|---|---|---|---|---|---|---|---|---|---|---|---|---|
| 3 | $CH_3$ | $CH_3$ | $i\text{-}C_3H_7$ | $CH_3$ | O | $C_{10}H_{17}N_2O_4PS$ | 292.3 | 0.56 | 41.1 / 42.5 | 5.9 / 6.1 | 9.6 / 9.3 | 10.6 / 10.3 | 11.0 / 10.9 |
| 4 | $CH_3$ | $CH_3$ | $CH_3$ | $N.C_4H_9$ | O | $C_{11}H_{19}N_2O_4PS$ | 306.3 | 0.61 | 43.1 / 44.6 | 6.3 / 6.1 | 9.1 / 9.0 | 10.1 / 9.8 | 10.5 / 10.1 |
| 5 | $CH_3$ | $CH_3$ | $C_2H_5$ | $CH_3$ | S | $C_9H_{15}N_2O_3PS_2$ | 294.3 | 0.54 | 36.7 / 38.8 | 5.1 / 5.6 | 9.5 / 9.7 | 10.5 / 9.4 | 21.8 / 21.6 |
| 6 | $C_2H_5$ | $C_2H_5$ | $C_2H_5$ | $CH_3$ | O | $C_{11}H_{19}N_2O_4PS$ | 306.3 | 0.60 | 43.1 | 6.3 | 9.1 | 10.1 | 10.5 |

| Example No. | $R_1$ | $R_2$ | $R_3$ | $R_4$ | Y | Empirical formula | Molecular weight | Rf-value* | Analysis % C | H | N | P | Calc. Found S |
|---|---|---|---|---|---|---|---|---|---|---|---|---|---|
| 7 | $C_2H_5$ | $C_2H_5$ | $CH_3$ | $CH_3$ | O | $C_{10}H_{17}N_2O_4PS$ | 292.3 | 0.58 | 44.2 / 41.1 | 6.8 / 5.9 | 8.7 / 9.6 | 10.6 / 10.6 | 10.6 / 11.0 |
| 8 | $C_2H_5$ | $C_2H_5$ | $i.C_3H_7$ | $CH_3$ | O | $C_{12}H_{21}N_2O_4PS$ | 320.3 | 0.46 | 41.4 / 45.0 | 5.7 / 6.6 | 8.9 / 8.7 | 10.8 / 9.7 | 10.6 / 10.0 |
| 9 | $CH_3$ | $CH_3$ | $n.C_3H_7$ | $CH_3$ | O | $C_{10}H_{17}N_2O_4PS$ | 292.3 | 0.46 | 46.3 / 41.1 | 7.1 / 5.9 | 8.7 / 9.6 | 10.2 / 10.6 | 9.9 / 11.0 |
| 10 | $CH_3$ | $CH_3$ | $C_2H_5$ | $C_2H_5$ | O | $C_{10}H_{17}N_2O_4PS$ | 292.3 | 0.49 | 41.6 / 41.1 | 6.2 / 5.9 | 9.6 / 9.6 | 10.4 / 10.6 | 11.0 / 11.0 |
| 11 | $CH_3$ | $CH_3$ | $n.C_3H_7$ | $C_2H_5$ | O | $C_{11}H_{19}N_2O_4PS$ | 306.3 | 0.55 | 40.0 / 43.1 | 6.2 / 6.3 | 9.4 / 9.1 | 10.5 / 10.1 | 11.0 / 10.5 |
| 12 | $C_2H_5$ | $C_2H_5$ | $n.C_3H_7$ | $C_2H_5$ | O | $C_{13}H_{23}N_2O_4PS$ | 334.4 | 0.65 | 43.8 / 46.7 | 6.6 / 6.9 | 8.9 / 8.4 | 9.8 / 9.3 | 10.6 / 9.6 |
| 13 | $CH_3$ | $CH_3$ | $i.C_3H_7$ | $C_2H_5$ | O | $C_{11}H_{19}N_2O_4PS$ | 306.3 | 0.57 | 46.0 / 43.1 | 6.4 / 6.3 | 8.0 / 9.1 | 8.8 / 10.1 | 8.9 / 10.5 |
| 14 | $C_2H_5$ | $C_2H_5$ | $i.C_3H_7$ | $C_2H_5$ | O | $C_{13}H_{23}N_2O_4PS$ | 334.4 | 0.59 | 44.9 / 46.7 | 6.7 / 6.9 | 8.5 / 8.4 | 10.4 / 9.3 | 10.7 / 9.6 |
| 15 | $C_2H_5$ | $C_2H_5$ | $CH_3$ | $C_2H_5$ | O | $C_{11}H_{19}N_2O_4PS$ | 306.3 | 0.48 | 48.0 / 43.1 | 7.3 / 6.3 | 8.3 / 9.1 | 9.3 / 10.1 | 10.0 / 10.5 |
| 16 | $CH_3$ | $CH_3$ | $C_2H_5$ | $C_2H_5$ | S | $C_{10}H_{17}N_2O_3PS_2$ | 308.3 | 0.57 | 44.5 / 39.0 | 6.4 / 5.6 | 9.0 / 9.1 | 10.2 / 10.0 | 9.9 / 20.8 |
| 17 | $C_2H_5$ | $C_2H_5$ | $C_2H_5$ | $C_2H_5$ | S | $C_{12}H_{21}N_2O_3PS_2$ | 336.4 | 0.59 | 40.3 / 42.8 | 6.7 / 6.3 | 8.8 / 8.3 | 10.1 / 9.2 | 20.4 / 19.1 |
| 18 | $CH_3$ | $CH_3$ | $CH_3$ | $i.C_3H_7$ | O | $C_{10}H_{17}N_2O_4PS$ | 292.3 | 0.55 | 43.5 / 41.4 | 6.7 / 5.9 | 8.4 / 9.6 | 10.0 / 10.6 | 18.3 / 11.0 |
| 19 | $C_2H_5$ | $C_2H_5$ | $CH_3$ | $i.C_3H_7$ | O | $C_{12}H_{21}N_2O_4PS$ | 320.3 | 0.57 | 41.5 / 45.0 | 5.9 / 6.6 | 9.8 / 8.7 | 10.4 / 9.7 | 11.0 / 10.0 |
| 20 | $CH_3$ | $CH_3$ | $C_2H_5$ | $i.C_3H_7$ | O | $C_{11}H_{19}N_2O_4PS$ | 306.3 | 0.56 | 45.1 / 43.1 | 6.7 / 6.3 | 8.8 / 9.1 | 9.6 / 10.1 | 9.7 / 10.5 |
| 21 | $C_2H_5$ | $C_2H_5$ | $C_2H_5$ | $i.C_3H_7$ | O | $C_{13}H_{23}N_2O_4PS$ | 334.4 | 0.62 | 43.8 / 46.7 | 6.4 / 6.9 | 9.3 / 8.4 | 9.8 / 9.3 | 10.5 / 9.6 |
| 22 | $CH_3$ | $CH_3$ | $n.C_3H_7$ | $i.C_3H_7$ | O | $C_{12}H_{21}N_2O_4PS$ | 320.3 | 0.62 | 48.0 / 45.0 | 7.1 / 6.6 | 8.2 / 8.7 | 9.3 / 9.7 | 9.3 / 10.8 |
| 23 | $C_2H_5$ | $C_2H_5$ | $n.C_3H_7$ | $i.C_3H_7$ | O | $C_{14}H_{25}N_2O_4PS$ | 348.4 | 0.55 | 46.9 / 48.3 | 6.9 / 7.2 | 8.8 / 8.0 | 9.9 / 8.9 | 10.2 / 9.2 |
| 24 | $C_2H_5$ | $C_2H_5$ | $i.C_3H_7$ | $i.C_3H_7$ | O | $C_{14}H_{25}N_2O_4PS$ | 348.4 | 0.55 | 48.1 / 48.3 | 7.6 / 7.2 | 7.7 / 8.0 | 8.8 / 8.9 | 8.6 / 9.2 |
| 25 | $CH_3$ | $CH_3$ | $CH_3$ | $i.C_3H_7$ | S | $C_{10}H_{17}N_2O_3PS_2$ | 308.3 | 0.56 | 49.0 / 39.0 | 7.6 / 5.6 | 8.4 / 9.1 | 9.0 / 10.0 | 9.2 / 20.8 |
| 26 | $C_2H_5$ | $C_2H_5$ | $CH_3$ | $i.C_3H_7$ | S | $C_{12}H_{21}N_2O_3PS_2$ | 336.4 | 0.59 | 40.0 / 42.8 | 6.0 / 6.3 | 8.9 / 8.3 | 10.5 / 9.2 | 20.5 / 19.1 |
| 27 | $CH_3$ | $CH_3$ | $C_2H_5$ | $i.C_3H_7$ | S | $C_{11}H_{19}N_2O_3PS_2$ | 322.4 | 0.54 | 42.9 / 41.0 | 6.4 / 5.9 | 7.9 / 8.7 | 9.0 / 9.6 | 18.6 / 19.9 |
| 28 | $CH_3$ | $CH_3$ | $CH_3$ | $n.C_3H_7$ | O | $C_{10}H_{17}N_2O_4PS$ | 292.3 | 0.51 | 42.0 / 41.1 | 6.7 / 5.9 | 8.6 / 9.6 | 9.3 / 10.6 | 19.5 / 11.0 |
| 29 | $C_2H_5$ | $C_2H_5$ | $CH_3$ | $n.C_3H_7$ | O | $C_{12}H_{21}N_2O_4PS$ | 320.3 | 0.61 | 42.2 / 45.0 | 6.2 / 6.6 | 9.6 / 8.7 | 9.8 / 9.7 | 10.6 / 10.8 |
| 30 | $C_2H_5$ | $C_2H_5$ | $C_2H_5$ | $n.C_3H_7$ | O | $C_{13}H_{23}N_2O_4PS$ | 334.4 | 0.63 | 46.3 / 46.7 | 7.1 / 6.9 | 8.9 / 8.4 | 10.0 / 9.3 | 10.4 / 9.6 |
| 31 | $CH_3$ | $CH_3$ | $C_2H_5$ | $n.C_3H_7$ | O | $C_{11}H_{19}N_2O_4PS$ | 306.3 | 0.60 | 47.2 / 43.1 | 7.3 / 6.3 | 8.2 / 9.1 | 8.9 / 10.1 | 9.6 / 10.5 |
| 32 | $CH_3$ | $CH_3$ | $i.C_3H_7$ | $n.C_3H_7$ | O | $C_{12}H_{21}N_2O_4PS$ | 320.3 | 0.57 | 44.0 / 45.0 | 6.6 / 6.6 | 9.2 / 8.7 | 10.3 / 9.7 | 10.5 / 10.8 |
| 33 | $C_2H_5$ | $C_2H_5$ | $i.C_3H_7$ | $n.C_3H_7$ | O | $C_{14}H_{25}N_2O_4PS$ | 348.4 | 0.60 | 46.8 / 48.3 | 7.2 / 7.2 | 9.0 / 8.0 | 10.0 / 8.9 | 10.5 / 9.2 |
| 34 | $CH_3$ | $CH_3$ | $CH_3$ | $n.C_3H_7$ | S | $C_{10}H_{17}N_2O_3PS_2$ | 308.3 | 0.56 | 49.1 / 39.0 | 7.5 / 5.6 | 8.0 / 9.1 | 9.3 / 10.0 | 9.0 / 20.8 |
| 35 | $C_2H_5$ | $C_2H_5$ | $CH_3$ | $n.C_3H_7$ | S | $C_{12}H_{21}N_2O_3PS_2$ | 336.4 | 0.59 | 40.0 / 42.8 | 5.9 / 6.3 | 9.2 / 8.3 | 9.7 / 9.2 | 20.5 / 19.1 |
| 36 | $CH_3$ | $CH_3$ | $C_2H_5$ | $n.C_3H_7$ | S | $C_{11}H_{19}N_2O_3PS_2$ | 322.4 | 0.57 | 43.7 / 41.0 | 6.7 / 5.9 | 8.3 / 8.7 | 9.3 / 9.6 | 18.9 / 19.9 |
| 37 | $C_2H_5$ | $C_2H_5$ | $C_2H_5$ | $n.C_3H_7$ | S | $C_{13}H_{23}N_2O_3PS_2$ | 350.4 | 0.55 | 41.8 / 44.6 | 6.4 / 6.6 | 8.8 / 8.0 | 9.9 / 8.8 | 19.8 / 18.3 |
| 38 | $C_2H_5$ | $C_2H_5$ | $C_2H_5$ | $i.C_3H_7$ | S | $C_{13}H_{23}N_2O_3PS_2$ | 350.4 | 0.52 | 45.6 / 44.6 | 7.1 / 6.6 | 8.1 / 8.0 | 9.2 / 8.8 | 18.1 / 18.3 |
| 39 | $C_2H_5$ | $C_2H_5$ | $C_2H_5$ | $C_2H_5$ | O | $C_{12}H_{21}N_2O_4PS$ | 320.3 | 0.59 | 44.7 / 45.0 | 7.5 / 6.6 | 7.4 / 8.7 | 8.4 / 9.7 | 17.9 / 10.0 |
| 40 | $CH_3$ | $CH_3$ | $C_2H_5$ | $CH_3$ | S | $C_9H_{15}N_2O_3PS_2$ | 294.3 | 0.54 | 45.8 / 36.7 | 7.0 / 5.1 | 8.4 / 9.5 | 9.6 / 10.5 | 10.0 / 21.8 |
| 41 | $C_2H_5$ | $C_2H_5$ | $C_2H_5$ | $CH_3$ | S | $C_{11}H_{19}N_2O_3PS_2$ | 322.4 | 0.61 | 37.6 / 41.0 | 5.6 / 5.9 | 9.7 / 8.7 | 9.4 / 9.6 | 21.6 / 19.9 |
| 42 | $C_2H_5$ | $C_2H_5$ | $CH_3$ | $CH_3$ | S | $C_{10}H_{17}N_2O_3PS_2$ | 308.3 | 0.56+ | 41.9 / 39.0 | 6.3 / 5.6 | 8.7 / 9.1 | 9.7 / 10.0 | 19.9 / 20.8 |
| 43 | $C_2H_5$ | $C_2H_5$ | $n.C_3H_7$ | $CH_3$ | O | $C_{12}H_{21}N_2O_4PS$ | 320.3 | 0.53 | 38.2 / 45.0 | 5.4 / 6.6 | 9.5 / 8.7 | 9.9 / 9.7 | 20.6 / 10.0 |
| 44 | $C_2H_5$ | $C_2H_5$ | $CH_3$ | $C_2H_5$ | S | $C_{11}H_{19}N_2O_3PS_2$ | 322.4 | 0.55 | 45.9 / 41.0 | 7.0 / 5.9 | 8.7 / 8.7 | 10.1 / 9.6 | 10.3 / 19.9 |
| 45 | $CH_3$ | $CH_3$ | $i.C_3H_7$ | $i.C_3H_7$ | O | $C_{12}H_{21}N_2O_4PS$ | 320.3 | 0.50 | 41.9 / 45.0 | 6.3 / 6.6 | 8.7 / 8.7 | 9.7 / 9.7 | 19.7 / 10.0 |
| 46 | $CH_3$ | $CH_3$ | $n.C_3H_7$ | $n.C_3H_7$ | O | $C_{12}H_{21}N_2O_4PS$ | 320.3 | 0.59 | 45.8 / 45.0 | 7.0 / 6.6 | 8.4 / 8.7 | 9.5 / 9.7 | 10.5 / 10.0 |
| 47 | $C_2H_5$ | $C_2H_5$ | $n.C_3H_7$ | $n.C_3H_7$ | O | $C_{14}H_{25}N_2O_4PS$ | 348.4 | 0.52+ | 45.9 / 48.3 | 7.0 / 7.2 | 8.5 / 8.0 | 9.5 / 8.9 | 9.4 / 9.2 |
| 48 | $CH_3$ | $CH_3$ | $C_6H_5$ | $C_2H_5$ | O | $C_{14}H_{17}N_2O_4PS$ | 340.3 | 0.40 | 47.9 / 49.7 | 7.4 / 5.0 | 8.0 / 8.2 | 8.8 / 9.1 | 9.0 / 9.4 |
| 49 | $CH_3$ | $CH_3$ | $CH_3$ | $C_2H_5$ | O | $C_9H_{15}N_2O_4PS$ | 278.3 | 0.66 | 49.9 / 38.8 | 5.5 / 5.4 | 8.7 / 10.1 | 8.6 / 11.1 | 9.1 / 11.5 |
| 50 | $CH_3$ | $CH_3$ | $CH_3$ | $CH_3$ | S | $C_8H_{13}N_2O_3PS_2$ | 280.3 | 0.72 | 39.2 / 34.3 | 5.9 / 4.7 | 9.8 / 10.0 | 10.7 / 11.1 | 10.7 / 22.9 |
| 51 | $CH_3$ | $CH_3$ | $CH_3$ | $C_2H_5$ | S | $C_9H_{15}N_2O_3PS_2$ | 294.3 | 0.70 | 35.0 / 36.7 | 5.0 / 5.1 | 9.8 / 9.5 | 10.9 / 10.5 | 22.2 / 21.8 |
|  |  |  |  |  |  |  |  |  | 37.3 | 5.4 | 9.3 | 11.0 | 22.3 |

*) on silica gel thin layer plates with ether as eluant
+) on silica gel thin layer plates with benzene/ether (6:4) as eluant.

EXAMPLE 52

0,0-Diethyl-0-(2-methyl-4-methoxy-pyrimidinyl-6)-phosphate 7.2 g (0.15 mol) of sodium hydride (50 percent in mineral oil) are added while stirring vigorously and in the absence of moisture to 21 g (0.15 mol) of 2-methyl-4-methoxy-6-hydroxypyrimidine in 400 cc of absolute dimethylformamide. After stirring the mixture at room temperature for about half an hour solids are rapidly removed by suction and 25.8 g (0.15 mol) of diethyl-phosphoric acid chloride in 100 cc of absolute toluene are added dropwise during the course of about 30 minutes and while stirring to the filtrate. The mixture is stirred at room temperature for about 4½ further hours, is removed by suction and the filtrate is set free from the solvent in a vacuum/high vacuum. The residue is digested three times with 200 cc amounts of ether and the etheral solution is evaporated in a vacuum. The crude product may as far as possible be purified immediately afterwards on a silica gel column with ether as eluant. The substance is obtained in the form of a colourless oil. The degree of purity is examined on silica gel thin layer plates with fluorescence indicator and ether as eluant. Rf-value = 0.23.

Analysis: $C_{10}H_{17}N_2O_5P$  Molecular weight: 276.2
Calc.  C 43.5 %  H 6.2 %  N 10.1 %  P 11.2 %
Found  43.0 %  6.4 %  10.0 %  10.8 %

EXAMPLE 53

0-Methyl-N-methyl-0-(2-ethyl-4-methoxypyrimidinyl-6)-thionophosphoroamidate 20.0 g (0.145 mol) of $K_2CO_3$ are added to a solution of 15.4 g (0.1 mol) of 2-ethyl-4-methoxy-6-hydroxy-pyrimidine in 250 cc of acetic acid and 16.0 g (0.1 mol) of 0-methyl-N-methyl-thiophosphoroamidochloridate are subsequently added at room temperature within 5 minutes. The reaction mixture is stirred at room temperature for half an hour and is then boiled under reflux at a bath temperature of 80°–90° for 5 hours. After cooling the precipitate is removed by suction and the reaction solution is concentrated by evaporation in a vacuum. The 0-methyl-N-methyl-0-(2-ethyl-4-methoxy-pyrimidinyl-6)-thiophosphoroamidate is obtained as a crystalline mass which may be recrystallized from acetic ester. Colourless crystals having a M.P. of 51° to 53.5° are obtained.

Analysis: $C_9H_{16}N_3O_3PS$  Molecular weight, 277.3
Calc.  C 39.0 %  H 5.8 %  N 15.2 %  P 11.6 %  S 11.2 %
Found  38.7 %  5.9 %  15.1 %  11.5 %  11.2 %

EXAMPLE 54

0-Methyl-N-methyl-0-(2-isopropyl-4-methoxypyrimidinyl-6)-phosphoroamidate

A solution of 14.35 g (0.1 mol) of 0-methyl-N-methyl-phosphoroamidochloridate in 300 cc of toluene is added dropwise within 15 minutes to a solution of 19.0 g (0.1 mol) of the sodium salt of 2-isopropyl-4-methoxy-6-hydroxy-pyrimidine in 100 cc of absolute toluene; the reaction mixture is stirred at room temperature for one further hour and is subsequently heated to 50° for 8 hours. The reaction mixture is then cooled, washed three times with 200 cc amounts of water until the pH value of the washings is 7, the toluene phase is dried over $Na_2SO_4$ and the toluene is decanted at a rotatory evaporator. The 0-methyl-N-methyl-0-(2-isopropyl-4-methoxy-pyrimidinyl-6)-phosphoroamidate is obtained as yellow oil.

Analysis: $C_{10}H_{18}N_3O_4P$  Molecular weight: 275.2
Calc.  C 43.6 %  H 6.6 %  N 15.3 %  P 11.3 %
Found  43.9 %  6.7 %  15.3 %  11.1 %

The degree of purity of the compounds produced in accordance with the invention may be checked by thin layer chromatography (silica gel plates, eluant : ether).

The sodium salt of the 2-isopropyl-4-methoxy-6-hydroxypyrimidine may, for example, be produced by reaction of the hydroxypyrimidine with sodium methylate in methanol and evaporation of the solvent. In analogous manner as described in Examples 53 and 54 the following compounds of formula I are obtained, whereby in Examples 55 – 103 Z signifies —NH—.

| Exple. No. | $R_1$ | $R_2$ | $R_3$ | $R_4$ | Q | Y | Empirical formula Molecular weight | Analysis C | H | N | Calc. % Found S | P | M.P. [°C] |
|---|---|---|---|---|---|---|---|---|---|---|---|---|---|
| 55 | $CH_3$ | $CH_3$ | $CH_3$ | $C_2H_5$ | S | S | $C_9H_{16}N_3O_2PS_2$ 293.3 | 36.9 36.6 | 5.5 5.4 | 14.3 14.4 | 21.9 21.7 | 10.6 10.8 | 61–63 |
| 56 | $CH_3$ | $CH_3$ | $C_2H_5$ | $C_2H_5$ | S | S | $C_{10}H_{18}N_3O_2PS_2$ 307.4 | 39.1 39.3 | 5.9 5.7 | 13.7 13.9 | 20.9 20.6 | 10.1 10.3 | 39.5–40 |
| 57 | $CH_3$ | $CH_3$ | $CH_3$ | $iC_3H_7$ | O | S | $C_{10}H_{18}N_3O_3PS$ 291.3 | 41.2 41.5 | 6.2 6.4 | 14.4 14.5 | 11.0 10.8 | 10.6 10.8 | oil |
| 58 | $CH_3$ | $CH_3$ | $C_2H_5$ | $iC_3H_7$ | O | S | $C_{11}H_{20}N_3O_3PS$ 305.3 | 43.3 43.6 | 6.6 6.7 | 13.8 13.8 | 10.5 10.5 | 10.1 9.8 | oil |
| 59 | $CH_3$ | $CH_3$ | $CH_3$ | $C_2H_5$ | O | S | $C_9H_{16}N_3O_3PS$ 277.3 | 39.0 39.0 | 5.8 5.7 | 15.2 15.0 | 11.6 11.9 | 11.2 10.9 | oil oil |
| 60 | $CH_3$ | $CH_3$ | $C_2H_5$ | $C_2H_5$ | O | S | $C_{10}H_{18}N_3O_3PS$ 291.3 | 41.2 41.4 | 6.2 6.2 | 14.4 14.6 | 11.0 11.3 | 10.6 10.3 | oil |
| 61 | $CH_3$ | $C_2H_5$ | $CH_3$ | $C_2H_5$ | O | O | $C_{10}H_{18}N_3O_4P$ 275.2 | 43.6 43.9 | 6.6 6.8 | 15.3 15.0 | — — | 11.3 10.9 | 41–45 |
| 62 | $C_2H_5$ | $CH_3$ | $CH_3$ | $C_2H_5$ | O | O | $C_{10}H_{18}N_3O_4P$ 275.2 | 43.6 43.8 | 6.6 6.9 | 15.3 15.1 | — — | 11.3 11.0 | 53 |
| 63 | $C_2H_5$ | $C_2H_5$ | $CH_3$ | $C_2H_5$ | O | O | $C_{11}H_{20}N_3O_4P$ 289.3 | 45.7 46.0 | 7.0 7.1 | 14.5 14.7 | — — | 10.7 10.7 | oil |

—Continued

| Exple. No. | $R_1$ | $R_2$ | $R_3$ | $R_4$ | Q | Y | Empirical formula Molecular weight | C | H | N | Found S | P | M.P. [°C] |
|---|---|---|---|---|---|---|---|---|---|---|---|---|---|
| 64 | $CH_3$ | $CH_3$ | iso-$C_3H_7$ | $C_5$ | O | O | $C_{11}H_{20}N_3O_4P$ 289.3 | 45.7 45.8 | 7.0 7.1 | 14.5 14.7 | — — | 10.7 10.4 | oil |
| 65 | $CH_3$ | $CH_3$ | $nC_3H_7$ | $iC_3H_7$ | O | O | $C_{12}H_{22}N_3O_4P$ 303.3 | 47.5 47.7 | 7.3 7.6 | 13.9 13.9 | — — | 10.2 10.0 | oil |
| 66 | $CH_3$ | $CH_3$ | $iC_3H_7$ | $iC_3H_7$ | O | O | $C_{12}H_{22}N_3O_4P$ 303.3 | 47.5 47.8 | 7.3 7.5 | 13.9 13.6 | — — | 10.2 9.9 | oil |
| 67 | $CH_3$ | $CH_3$ | $C_2H_5$ | $CH_3$ | O | O | $C_9H_{16}N_3O_4P$ 261.2 | 41.4 41.0 | 6.2 6.4 | 16.1 15.8 | — — | 11.9 11.7 | 55–56 |
| 68 | $CH_3$ | $CH_3$ | $nC_3H_7$ | $CH_3$ | O | O | $C_{10}H_{18}N_3O_4P$ 275.2 | 43.6 43.3 | 6.6 6.8 | 15.3 15.0 | — — | 11.3 11.2 | oil |
| 69 | $CH_3$ | $CH_3$ | $nC_3H_7$ | $CH_3$ | S | O | $C_{10}H_{18}N_3O_3PS$ 291.3 | 41.2 41.5 | 6.2 6.4 | 14.4 14.1 | 11.0 10.7 | 10.6 10.8 | 44–45 |
| 70 | $CH_3$ | $CH_3$ | $C_2H_5$ | $CH_3$ | O | S | $C_9H_{16}N_3O_3PS$ 277.3 | 39.0 39.3 | 5.8 6.0 | 15.2 15.0 | 11.6 11.3 | 11.2 11.0 | oil |
| 71 | $CH_3$ | $CH_3$ | $C_2H_5$ | $CH_3$ | S | S | $C_9H_{16}N_3O_2PS_2$ 293.3 | 36.9 36.9 | 5.5 5.7 | 14.3 14.6 | 21.8 22.0 | 10.6 10.6 | 49–51 |
| 72 | $CH_3$ | $CH_3$ | $C_2H_5$ | $iC_3H_7$ | S | S | $C_{11}H_{20}N_3O_2PS_2$ 321.4 | 41.1 40.9 | 6.3 6.3 | 13.1 13.1 | 20.0 20.3 | 9.6 9.9 | 52–54 |
| 73 | $CH_3$ | $CH_3$ | $nC_3H_7$ | $iC_3H_7$ | S | O | $C_{12}H_{22}N_3O_3PS$ 319.4 | 45.1 45.4 | 6.9 7.1 | 13.2 13.1 | 10.0 10.2 | 10.7 10.4 | oil |
| 74 | $CH_3$ | $CH_3$ | $iC_3H_7$ | $iC_3H_7$ | S | O | $C_{12}H_{22}N_3O_3PS$ 319.4 | 45.1 44.9 | 6.9 7.0 | 13.2 13.0 | 10.0 10.2 | 10.7 10.5 | oil |
| 75 | $CH_3$ | $CH_3$ | $C_2H_5$ | $CH_3$ | S | O | $C_9H_{16}N_3O_3PS$ 277.3 | 39.0 38.7 | 5.8 5.9 | 15.2 15.3 | 11.6 11.9 | 11.2 11.4 | 57–59 |
| 76 | $CH_3$ | $CH_3$ | $nC_3H_7$ | $C_2H_5$ | S | O | $C_{11}H_{20}N_3O_3PS$ 305.3 | 43.3 43.3 | 6.6 6.7 | 13.8 14.0 | 10.5 10.7 | 10.1 10.4 | 41–42 |
| 77 | $CH_3$ | $CH_3$ | $CH_3$ | $CH_3$ | O | O | $C_8H_{14}N_3O_4P$ 247.2 | 38.9 38.5 | 5.7 5.8 | 17.0 17.1 | — — | 12.5 12.2 | 63–64 |
| 78 | $CH_3$ | $CH_3$ | $CH_3$ | $C_2H_5$ | O | O | $C_9H_{16}N_3O_4P$ 261.2 | 41.4 41.7 | 6.2 6.3 | 16.1 16.2 | — — | 11.9 11.6 | 72–74 |
| 79 | $CH_3$ | $CH_3$ | $CH_3$ | $nC_3H_7$ | O | S | $C_{10}H_{18}N_3O_3PS$ 291.3 | 41.2 41.5 | 6.2 6.3 | 14.4 14.3 | 11.0 11.3 | 10.6 10.3 | oil |
| 80 | $CH_3$ | $CH_3$ | $CH_3$ | $nC_3H_7$ | O | O | $C_{10}H_{18}N_3O_4P$ 275.2 | 43.6 43.8 | 6.6 6.8 | 15.3 15.4 | — — | 11.3 11.0 | oil |
| 81 | $CH_3$ | $CH_3$ | $C_2H_5$ | $nC_3H_7$ | O | O | $C_{11}H_{20}N_3O_4P$ 289.3 | 45.7 45.9 | 7.0 7.1 | 14.5 14.8 | — — | 10.7 10.4 | oil |
| 82 | $CH_3$ | $CH_3$ | $nC_3H_7$ | $nC_3H_7$ | O | O | $C_{12}H_{22}N_3O_4P$ 303.3 | 47.5 47.8 | 7.3 7.6 | 13.9 13.7 | — — | 10.2 10.0 | oil |
| 83 | $CH_3$ | $CH_3$ | $iC_3H_7$ | $nC_3H_7$ | O | O | $C_{12}H_{22}N_3O_4P$ 303.3 | 47.5 47.8 | 7.3 7.5 | 13.9 13.6 | — — | 10.2 — | oil |
| 84 | $CH_3$ | $CH_3$ | $C_2H_5$ | $nC_3H_7$ | O | S | $C_{11}H_{20}N_3O_3PS$ 305.3 | 43.3 43.6 | 6.6 6.8 | 13.8 13.7 | 10.5 10.6 | 10.1 10.6 | oil |
| 85 | $CH_3$ | $CH_3$ | $C_2H_5$ | $iC_3H_7$ | O | O | $C_{11}H_{20}N_3O_4P$ 289.3 | 45.7 45.9 | 7.0 7.2 | 14.5 14.8 | — — | 10.7 10.5 | oil |
| 86 | $CH_3$ | $CH_3$ | $nC_3H_7$ | $C_2H_5$ | O | O | $C_{11}H_{20}N_3O_4P$ 289.3 | 45.7 45.7 | 7.0 7.0 | 14.5 14.7 | — — | 10.7 10.5 | 35–36 |
| 87 | $CH_3$ | $CH_3$ | $CH_3$ | $iC_3H_7$ | S | S | $C_{10}H_{18}N_3O_2OS_2$ 307.4 | 39.1 39.4 | 5.9 6.1 | 13.7 13.5 | 20.9 21.0 | 10.1 10.3 | oil |
| 88 | $CH_3$ | $CH_3$ | $CH_3$ | $CH_3$ | S | O | $C_8H_{14}N_3O_3PS$ 263.3 | 36.5 36.2 | 5.4 5.5 | 16.0 15.8 | 12.2 11.9 | 11.8 11.5 | 71–72 |
| 89 | $CH_3$ | $CH_3$ | $iC_3H_7$ | $CH_3$ | S | O | $C_{10}H_{18}N_3O_3PS$ 291.3 | 41.2 40.9 | 6.2 6.4 | 14.4 14.2 | 11.0 11.1 | 10.6 10.9 | 55–56 |
| 90 | $CH_3$ | $CH_3$ | $iC_3H_7$ | $CH_3$ | O | O | $C_{10}H_{18}N_3O_4P$ 275.2 | 43.6 43.3 | 6.6 6.8 | 15.3 15.3 | — — | 11.3 11.2 | oil |
| 91 | $CH_3$ | $CH_3$ | $CH_3$ | $CH_3$ | S | S | $C_8H_{14}N_3O_2PS_2$ 279.3 | 34.4 34.7 | 5.1 5.3 | 15.0 14.8 | 23.0 22.7 | 11.1 11.4 | 56–60 |
| 92 | $CH_3$ | $CH_3$ | $CH_3$ | $CH_3$ | O | S | $C_8H_{14}N_3O_3PS$ 263.3 | 36.5 36.2 | 5.4 5.5 | 16.0 15.8 | 12.2 12.0 | 11.8 11.5 | 64–67 |
| 93 | $CH_3$ | $CH_3$ | $C_2H_5$ | $C_2H_5$ | S | O | $C_{10}H_{18}N_3O_3PS$ 291.3 | 41.2 40.9 | 6.2 6.2 | 14.4 14.6 | 11.0 11.2 | 10.6 10.9 | 46.5–48 |
| 94 | $CH_3$ | $CH_3$ | $CH_3$ | $nC_3H_7$ | S | S | $C_{10}H_{18}N_3O_2PS_2$ 307.4 | 39.1 39.3 | 5.9 6.0 | 13.7 13.4 | 20.9 20.8 | 10.1 10.4 | 73.5–75 |
| 95 | $CH_3$ | $CH_3$ | $iC_3H_7$ | $C_2H_5$ | S | O | $C_{11}H_{20}N_3O_3PS$ 305.3 | 43.3 43.0 | 6.6 6.6 | 13.8 13.9 | 10.5 10.2 | 10.1 10.1 | oil |
| 96 | $CH_3$ | $CH_3$ | $C_2H_5$ | $C_2H_5$ | O | O | $C_{10}H_{18}N_3O_4P$ 275.2 | 43.6 43.3 | 6.6 6.4 | 15.3 15.0 | — — | 11.3 11.0 | oil |
| 97 | $CH_3$ | $CH_3$ | $CH_3$ | $nC_3H_7$ | S | O | $C_{10}H_{18}N_3O_3PS$ 291.3 | 41.2 41.1 | 6.2 6.3 | 14.4 14.2 | 11.0 11.2 | 10.6 10.3 | 45–47 |
| 98 | $CH_3$ | $CH_3$ | $C_2H_5$ | $nC_3H_7$ | S | O | $C_{11}H_{20}N_3O_3PS$ 305.3 | 43.3 43.1 | 6.6 6.7 | 13.8 13.5 | 10.5 10.8 | 10.1 10.3 | 43–45 |
| 99 | $CH_3$ | $CH_3$ | $nC_3H_7$ | $nC_3H_7$ | S | O | $C_{12}H_{22}N_3O_3PS$ 319.4 | 45.1 45.3 | 6.9 7.1 | 13.2 12.9 | 10.0 9.9 | 99.7 10.0 | oil |
| 100 | $CH_3$ | $CH_3$ | $iC_3H_7$ | $nC_3H_7$ | S | O | $C_{12}H_{22}N_3O_3PS$ 319.4 | 45.1 44.9 | 6.9 6.8 | 13.2 13.1 | 10.0 10.3 | 9.7 9.9 | oil |
| 101 | $CH_3$ | $CH_3$ | $C_2H_5$ | $nC_3H_7$ | S | S | $C_{11}H_{20}N_3O_2PS_2$ 321.4 | 41.1 41.3 | 6.3 6.4 | 13.1 13.4 | 20.3 20.2 | 9.6 9.4 | oil |
| 102 | $CH_3$ | $CH_3$ | $CH_3$ | $iC_3H_7$ | S | O | $C_{10}H_{18}N_3O_3PS$ 291.3 | 41.2 41.0 | 6.2 6.4 | 14.4 14.6 | 11.0 11.2 | 10.6 10.9 | oil |
| 103 | $CH_3$ | $CH_3$ | $C_2H_5$ | $iC_3H_7$ | S | O | $C_{11}H_{20}N_3O_3PS$ 305.3 | 43.3 42.9 | 6.6 6.7 | 13.8 14.1 | 10.5 10.7 | 10.1 10.2 | 42–44 |

In analogous manner as described in Examples 53 and 54 the following compounds of general formula I were produced:

EXAMPLE 104

0-Methyl-N-dimethyl-0-(2-ethyl-4-ethoxy-pyrimidinyl-6)-thionophosphoroamidate
Slightly yellow oil.

Analysis: $C_{11}H_{20}N_3O_3PS$    Molecular weight: 305.3

| | | | | |
|---|---|---|---|---|
| Calc.  C 43.3 % | H 6.6 % | N 13.8 % | S 10.5 % | P 10.1 % |
| Found  43.6 % | 6.7 % | 13.5 % | 10.8 % | 9.8 % |

EXAMPLE 105

0-Methyl-N-dimethyl-0-(2-ethyl-4-ethoxy-pyrimidinyl-6)-phosphoroamidate
Oil.

Analysis: $C_{11}H_{20}N_3O_4P$    Molecular weight: 289.3

| | | | |
|---|---|---|---|
| Calc.  C 45.7 % | 7.0 % | N 14.5 % | P 10.7 % |
| Found  46.0 % | 7.2 % | 14.7 % | 10.4 % |

STARTING MATERIALS

The production of the starting compounds of formula II may be effected in accordance with the following Examples:

warm solution of 9.2 g of metallic sodium in 140 cc of absolute ethanol. When a clear solution is obtained it is transferred into a heatable autoclave. After heating the solution to 130° for 96 hours in the autoclave it is cooled down and the solvent is evaporated. The residue is dissolved in about 200 cc of water. Then the pH value is adjusted to 6 with glacial acetic acid and while stirring vigorously. Cooling to about 4° is effected and after about 10 minutes the obtained crystals which may be washed with a small amount of icewater are filtered off. The colourless needle shaped crystals may be recrystallized from water. M.P. 193°–194°.

Analysis: $C_7H_{10}N_2O_2$    Molecular weight: 154.2

| | | |
|---|---|---|
| Calc.  C 54.5 % | H 6.5 % | N 18.2 % |
| Found  54.7 % | 6.5 % | 18.2 % |

In analogous manner as described for 2-methyl-4-ethoxy-6-hydroxypyrimidine (Example 106) the following compounds of general formula II may be produced.

| Example No. | $R_3$ | $R_4$ | Y | Empirical formula | Molecular weight | Analysis % C | H | Calc. Found N | M.P. [°C] |
|---|---|---|---|---|---|---|---|---|---|
| 107 | $n.C_3H_7$ | $CH_3$ | O | $C_8H_{12}N_2O_2$ | 168.2 | 57.1 57.6 | 7.2 7.5 | 16.7 16.5 | 140 – 141 |
| 108 | $i.C_3H_7$ | $CH_3$ | O | $C_8H_{12}N_2O_2$ | 168.2 | 57.1 56.9 | 7.2 7.1 | 16.7 16.5 | 158 – 159 |
| 109 | $n.C_3H_7$ | $C_2H_5$ | O | $C_9H_{14}N_2O_2$ | 182.2 | 59.3 59.3 | 7.7 7.6 | 15.4 15.4 | 99 – 100 |
| 110 | $i.C_3H_7$ | $C_2H_5$ | O | $C_9H_{14}N_2O_2$ | 182.2 | 59.3 59.2 | 7.7 7.7 | 15.4 15.6 | 79 – 80 |
| 111 | $CH_3$ | $i.C_3H_7$ | O | $C_8H_{12}N_2O_2$ | 168.2 | 57.1 56.9 | 7.2 7.1 | 16.7 16.5 | 143 – 144 |
| 112 | $C_2H_5$ | $i.C_3H_7$ | O | $C_9H_{14}N_2O_2$ | 182.2 | 59.3 59.4 | 7.7 7.8 | 15.4 15.4 | 137 – 138 |
| 113 | $n.C_3H_7$ | $i.C_3H_7$ | O | $C_{10}H_{16}N_2O_2$ | 196.2 | 61.2 61.1 | 8.2 8.3 | 14.3 14.3 | 118 – 119 |
| 114 | $i.C_3H_7$ | $i.C_3H_7$ | O | $C_{10}H_{16}N_2O_2$ | 196.2 | 61.2 61.1 | 8.2 8.3 | 14.3 14.2 | 136 – 137 |
| 115 | $CH_3$ | $n.C_4H_9$ | O | $C_9H_{14}N_2O_2$ | 182.2 | 59.3 59.9 | 7.7 7.9 | 15.4 15.3 | 81 – 82 |
| 116 | $C_2H_5$ | $C_2H_5$ | O | $C_8H_{12}N_2O_2$ | 168.2 | 57.1 57.4 | 7.2 7.1 | 16.7 16.4 | 123 – 124 |
| 117 | $CH_3$ | $n.C_3H_7$ | O | $C_8H_{12}N_2O_2$ | 168.2 | 57.1 56.9 | 7.2 7.2 | 16.7 16.8 | 98 – 100 |
| 118 | $n.C_3H_7$ | $n.C_3H_7$ | O | $C_{10}H_{16}N_2O_2$ | 196.2 | 61.2 61.1 | 8.2 8.3 | 14.3 14.2 | 89 – 90 |
| 119 | $C_2H_5$ | $n.C_3H_7$ | O | $C_9H_{14}N_2O_2$ | 182.2 | 59.3 59.3 | 7.7 7.8 | 15.4 15.3 | 94 – 95 |
| 120 | $i.C_3H_7$ | $n.C_3H_7$ | O | $C_{10}H_{16}N_2O_2$ | 196.2 | 61.2 61.3 | 8.2 8.4 | 14.3 14.0 | 84 – 86 |
| 121 | $C_6H_5$ | $C_2H_5$ | O | $C_{12}H_{12}N_2O_2$ | 216.2 | 66.7 66.2 | 5.6 5.6 | 13.0 12.7 | 158 – 159 |
| 122 | $CH_3$ | $CH_3$ | O | $C_6H_8N_2O_2$ | 140.14 | 51.4 51.0 | 5.8 5.7 | 20.0 19.9 | 249 – 251 |
| 123 | $CH_3$ | $C_2H_5$ | O | $C_7H_{10}N_2O_2$ | 154.17 | 54.5 54.5 | 6.5 6.5 | 18.2 17.9 | 139 – 140 |

EXAMPLE 106

2-Methyl-4-ethoxy-6-hydroxypyrimidine
28.8 g (0.2 mol) of 2-methyl-4-chloro-6-hydroxypirimidine are added while stirring to a still

EXAMPLE 124

2-Isopropyl-4-methylthio-6-hydroxypyrimidine
170 g (3.4 mols) of methyl mercaptan are introduced during the course of 30 minutes into a clear solution of 76 g of sodium metal in 1500 cc of methanol; the solution is kept at 0° by cooling with ice. The mixture is stirred for about half an hour with cooling and the excess of methyl mercaptan is decanted at the rotatory evaporator. In a pressure autoclave there are added 258 g (1.5 mol) of 2-isopropyl-4-chloro-6-hydroxypyrimidine with 100 cc of methanol to the methanolic solution of the sodium thiomethylate. The well closed autoclave is subsequently heated to 100° for 24 hours, is cooled to room temperature and the solvent is decanted in a vacuum. The residue is dissolved in 300 cc of water and precipitated by adding glacial acetic acid. Removal by suction is subsequently effected at 5°. It is recrystallized from alcohol/water (6:4) and dried at 80° in a vacuum. Colourless crystals having a M.P. of 205°–206° are obtained.

Analysis: $C_8H_{12}N_2OS$    Molecular weight: 184.2

| | C | H | N | S |
|---|---|---|---|---|
| Calc. | 52.1 % | 6.6 % | 15.2 % | 17.4 % |
| Found | 52.2 % | 6.6 % | 15.2 % | 17.7 % |

In analogous manner as described for 2-isopropyl-4-methylthio-6-hydroxypirimidine (Example 124) the following compounds of general formula II may also be produced:

| Example No. | $R_3$ | $R_4$ | Y | Empirical formula | Molecular weight | C | Analysis %<br>H | N | Calc.<br>Found<br>S | M.P. [°C] |
|---|---|---|---|---|---|---|---|---|---|---|
| 125 | $C_2H_5$ | $C_2H_5$ | S | $C_8H_{12}N_2OS$ | 184.2 | 52.1<br>51.9 | 6.6<br>6.7 | 15.2<br>15.0 | 17.4<br>17.4 | 117 – 118 |
| 126 | $C_2H_5$ | $CH_3$ | S | $C_7H_{10}N_2OS$ | 170.2 | 49.4<br>49.0 | 5.9<br>6.0 | 16.5<br>16.7 | 18.8<br>18.5 | 163 – 164 |
| 127 | $C_2H_5$ | $i.C_3H_7$ | S | $C_9H_{14}N_2OS$ | 198.3 | 54.5<br>54.5 | 7.1<br>7.1 | 14.1<br>14.1 | 16.2<br>16.4 | 158 – 159 |
| 128 | $CH_3$ | $n.C_3H_7$ | S | $C_8H_{12}N_2OS$ | 184.2 | 52.1<br>52.1 | 6.6<br>6.6 | 15.2<br>15.2 | 17.4<br>17.4 | 164 – 165 |
| 129 | $C_2H_5$ | $n.C_3H_7$ | S | $C_9H_{14}N_2OS$ | 198.3 | 54.5<br>54.5 | 7.1<br>7.0 | 14.8<br>14.2 | 16.2<br>16.0 | 93 – 94 |
| 130 | $CH_3$ | $CH_3$ | S | $C_6H_8N_2OS$ | 156.2 | 46.1<br>46.3 | 5.2<br>5.3 | 17.9<br>17.6 | 20.2<br>20.1 | 226 – 227 |
| 131 | $CH_3$ | $C_2H_5$ | S | $C_7H_{10}N_2OS$ | 170.2 | 49.4<br>49.3 | 5.9<br>5.9 | 16.5<br>16.4 | 18.8<br>18.4 | 160 – 161 |

What is claimed is:
1. A compound of the formula:

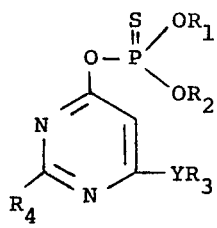

wherein
$R_1$ and $R_2$, which are the same, are methyl or ethyl,
$R_3$ is methyl, ethyl, n-propyl or isopropyl,
$R_4$ is methyl, ethyl, n-propyl, isopropy or n-butyl, and
Y is oxygen or sulfur.

2. A compound of claim 1 in which Y is oxygen.

3. The compound of claim 1 which is 0,0-diethyl-0-(2-isopropyl-4-methoxy-pyrimidinyl-6)-thionophosphate.

4. The compound of claim 1, which is 0,0-dimethyl-0-(2-ethyl-4-methoxy-pyrimidinyl-6)-thionophosphate.

5. The compound of claim 1, which is 0,0-dimethyl-0-(2-ethyl-4-ethoxy-pyrimidinyl-6)-thionophosphate.

6. The compound of claim 1, which is 0,0-dimethyl-0-(2-methyl-4-ethoxy-pyrimidinyl-6)-thionophosphate.

7. The compound of claim 1, which is 0,0-dimethyl-0-(2-isopropyl-4-methoxy-pyrimidinyl-6)-thionophosphate.

8. The compound of claim 1, which is 0,0-dimethyl-0-(2-n-propyl-4-ethoxy-pyrimidinyl-6)-thionophosphate.

9. The compound of claim 1, which is 0,0-dimethyl-0-(2-n-propyl-4-methoxy-pyrimidinyl-6)-thionophosphate.

10. The compound of claim 1, which is 0,0-dimethyl-0-(2-isopropyl-4-ethoxy-pyrimidinyl-6)-thionophosphate.

11. The compound of claim 1 which is 0,0-diethyl-0-(2-isopropyl-4-methylthio-pyrimidinyl-6)-thionophosphate.

* * * * *